(12) United States Patent
Bower et al.

(10) Patent No.: US 7,912,700 B2
(45) Date of Patent: Mar. 22, 2011

(54) CONTEXT BASED WORD PREDICTION

(75) Inventors: Jason Bower, Bothell, WA (US); Kenji Furuuchi, Tokyo (JP); Simon Liu, Beijing (CN); Kenichi Morimoto, Kanagawa (JP); Daryn Robbins, Duvall, WA (US); Chet Laughlin, Kirkland, WA (US); Peter Davis, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 924 days.

(21) Appl. No.: 11/704,381

(22) Filed: Feb. 8, 2007

(65) Prior Publication Data

US 2008/0195388 A1    Aug. 14, 2008

(51) Int. Cl.
  G06F 17/27  (2006.01)
  G06F 17/20  (2006.01)
  G06F 3/00   (2006.01)
(52) U.S. Cl. .................................. 704/9; 704/1; 715/708
(58) Field of Classification Search .................... None
See application file for complete search history.

(56) References Cited

U.S. PATENT DOCUMENTS

| | | | | |
|---|---|---|---|---|
| 5,377,281 | A | 12/1994 | Ballard et al. | 382/229 |
| 5,390,279 | A * | 2/1995 | Strong | 704/200 |
| 5,467,425 | A | 11/1995 | Lau et al. | 704/243 |
| 5,805,911 | A | 9/1998 | Miller | |
| 5,896,321 | A | 4/1999 | Miller et al. | |
| 5,907,839 | A | 5/1999 | Roth | |
| 6,204,848 | B1 | 3/2001 | Nowlan et al. | 715/810 |
| 6,223,059 | B1 | 4/2001 | Haestrup | 455/566 |
| 6,346,894 | B1 | 2/2002 | Connolly et al. | |
| 6,377,965 | B1 * | 4/2002 | Hachamovitch et al. | 715/203 |
| 6,578,032 | B1 | 6/2003 | Chandrasekar et al. | 707/6 |
| 6,687,697 | B2 | 2/2004 | Collins-Thompson et al. | 707/6 |
| 6,839,667 | B2 | 1/2005 | Reich | 704/240 |
| 6,917,910 | B2 | 7/2005 | Itoh et al. | |
| 6,922,810 | B1 * | 7/2005 | Trower et al. | 715/256 |
| 6,970,599 | B2 | 11/2005 | Longe et al. | |
| 7,031,908 | B1 | 4/2006 | Huang et al. | |
| 7,111,248 | B2 | 9/2006 | Mulvey et al. | 715/812 |

(Continued)

FOREIGN PATENT DOCUMENTS

JP    2006185380    7/2006

OTHER PUBLICATIONS

U.S. Office Action dated Apr. 2, 2009 cited in U.S. Appl. No. 11/704,111.

(Continued)

*Primary Examiner* — Matthew J Sked
(74) *Attorney, Agent, or Firm* — Merchant & Gould

(57) ABSTRACT

Context-based word prediction is provided. A software application utilizes words contained in an application document to provide context-based word prediction in the same or a related document. The software application creates an application defined data source and populates the data source with words occurring in a document. When the same or a related document is being edited via an input method, for example, typing, speech recognition, electronic handwriting, etc., a prediction engine presents candidate words from the application defined data source that match current text input, and the user may choose from the presented candidate words for automatic population into the document being edited. Information from the application defined data source may be transferred between computing devices, for example, between a mobile computing device and a desktop (non-mobile) computing device.

20 Claims, 10 Drawing Sheets

U.S. PATENT DOCUMENTS

| | | | |
|---|---|---|---|
| 7,296,223 B2 * | 11/2007 | Chidlovskii et al. | 715/234 |
| 7,630,980 B2 * | 12/2009 | Parikh | 707/6 |
| 7,657,423 B1 * | 2/2010 | Harik et al. | 704/9 |
| 2003/0046073 A1 | 3/2003 | Mori et al. | |
| 2004/0044422 A1 * | 3/2004 | Fux et al. | 700/17 |
| 2004/0153975 A1 | 8/2004 | Williams et al. | |
| 2005/0017954 A1 | 1/2005 | Kay et al. | 345/169 |
| 2005/0114770 A1 | 5/2005 | Sacher et al. | |
| 2006/0173678 A1 | 8/2006 | Gilbert et al. | |
| 2006/0190436 A1 | 8/2006 | Richardson et al. | |
| 2006/0190447 A1 | 8/2006 | Harmon et al. | |
| 2006/0259479 A1 | 11/2006 | Dai | |
| 2006/0265208 A1 | 11/2006 | Assadollahi | 704/9 |
| 2006/0265648 A1 | 11/2006 | Rainisto et al. | |
| 2008/0076472 A1 * | 3/2008 | Hyatt | 455/557 |
| 2008/0306732 A1 | 12/2008 | Ghenania et al. | 704/219 |

OTHER PUBLICATIONS

U.S. Office Action dated Feb. 2, 2010 cited in U.S. Appl. No. 11/704,111.

Chien, Jen-Tzung, "Association Pattern Language Modeling", IEEE Transactions On Audio, speech, And Language Processing, V. 14, No. 5, Sep. 2006, pp. 1719-1728 http://ieeexplore.ieee.org/iel5/10376/35293/01677991.pdf?isNumber=&htry=1.

Johansen, A.S., Hansen, J.P., "Augmentative and Alternative Communication: The Future of Text on the Move", The IT University of Copenhagen, Universal Access in the Information Society (UAIS), V. 5, No. 2, Aug. 2006, pp. 125-149, http://www.itu.dk/courses/U/E2005/forelaeningsslides/UAIS_Textonthemove.pdf.

Lieberman, et al., "Commonsense on the Go", BT Technology Journal, V. 22, No. 4, Oct. 2004, pp. 241-252, http://alumni.media.mit.edu/~tstocky/pubs/Lieberman.Faaborg.Espinosa.Stocky_BT04.pdf.

Vayrynen, Pertti, "Perspectives on the Utility of Linguistic Knowledge in English Word Prediction", Date Nov. 19, 2005, 237 pages, http://herkules.oulu.fi/isbn951427850X/isbn951427850X.pdf.

Kenji Furuuchi, Kenichi Morimoto, U.S. Appl. No. 11/704,111, filed Feb. 8, 2007, "Predicting Textual Candidates".

Komatsu, H., Takabayashi, S., Masui, T., "Corpus-based Predictive Text Input", 6 pages.

Van Den Bosch, A., "Scalable classification-based word prediction and confusable correction", TAL, V. 46—n° Feb. 2005, pp. 39-63, ILK/Language and Information Science, Tilburg University, The Netherlands.

Carlson, A.J., Rosen, J., Roth, D., "Scaling Up Context-Sensitive Text Correction", Department of Computer Science, University of Illinois at Urbana-Champaign, IAAI'01, Copyright 2001, American Association for Artificial Intelligence, 6 pages.

"EMU Manual Vienna University of Technology Institute "integrated study"", Copyright Vienna University of Technology, is-TU, Favoritenstrasse 11/029, A-1040 Vienna, Austria, Apr. 2006, 24 pages.

U.S. Office Action dated Oct. 7, 2009 cited in U.S. Appl. No. 11/704,111.

Notice of Allowance mailed May 21, 2010, in U.S. Appl. No. 11/704,111.

* cited by examiner

CONTEXT BASED WORD PREDICTION

BACKGROUND

Typing or otherwise entering information into a computing device can be cumbersome and time consuming where each individual word must be typed in its entirety or handwritten in its entirety in the case of electronic handwriting input methods or spoken accurately in the case of speech recognition input methods. Typing information on small mobile devices can be particularly difficult due to the decreased size or form factor of the mobile device and associated keyboard. With mobile devices, often some type of modified typing method, for example thumb typing, is required on a very small keyboard, or typing text via a twelve key keypad is required.

In response to these and other input difficulties, input methods have been developed that provide word prediction or word suggestions as a user types in order to reduce the number of keys that must be pressed. Prior solutions often make use of static dictionaries containing language dictionaries and lists of words that the user had previously entered using the input method. While these solutions may help the user in general text input, the words that are predicted are not always in the context of the current task the user is trying to complete. For example, according to current data input solutions, a word prediction user interface that changes after each key press may be provided, but if a user wants to type a word such as "threat," the user must type a number of characters, for example, "thre" before the prediction user interface shows the word "threat" desired by the user. And, the prediction user interface may show a number of unhelpful words, such as "three," "thread," and the like because the words are being retrieved from a non-contextual source such as a dictionary. Unfortunately, other words such as names and technical terms are not likely to be included in an available input prediction dictionary, and thus, these words and terms will not be predicted at all. For example, if the user desires to type a person's name, for example, "Alexandro Giordano," the user may be required to type each and every character making up the name because such a name is not likely to be included in an input prediction dictionary accessible by the input method in use.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing context-based word prediction. A software application utilizes words contained in an application document to provide context-based prediction in a related document. For example, an electronic mail application may utilize words contained in a received electronic mail message to provide word prediction during the preparation of a reply message to the received message.

According to an embodiment, the software application creates an application defined data source and populates the data source with words occurring in a document. When the same or a related document is being edited or created via an input method, for example, typing, speech recognition, electronic handwriting, etc., a prediction engine presents candidate words to the user as the user enters characters of words, and the user may choose from the presented candidate words for automatic population into the document. The prediction engine retrieves candidate words from the context-based application defined data source and, if available, from one or more existing sources of words, for example, electronic dictionaries. According to one embodiment, words from the context-based application data source may be ranked higher over words from the one or more existing sources. According to another embodiment, information from the application defined data source may be transferred between computing devices, for example, between a mobile computing device and a desktop (non-mobile) computing device.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
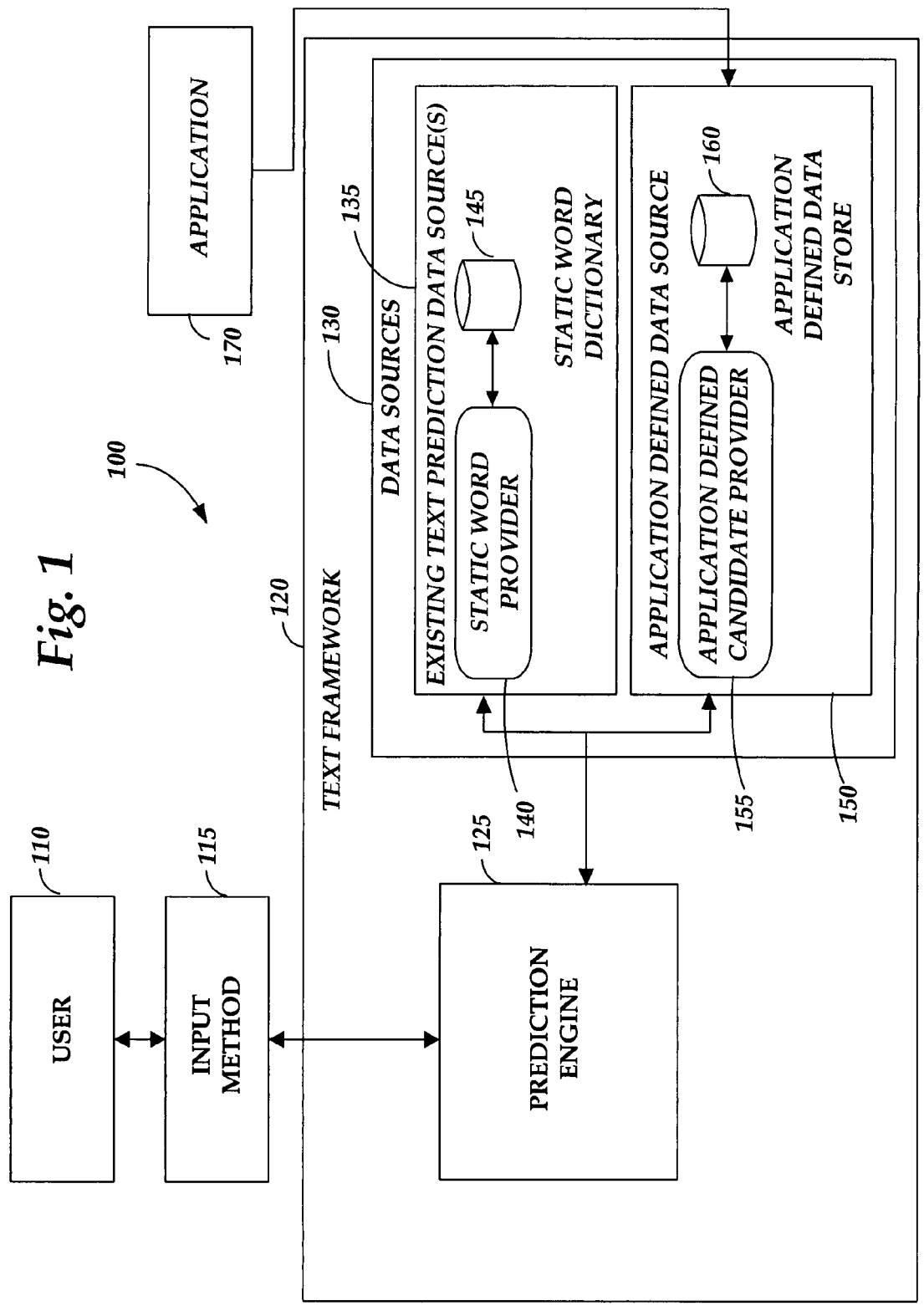
FIG. 1 is a simplified block diagram illustrating a system architecture of a context-based word prediction system.

As briefly described above, embodiments of the present invention are directed to context-based word prediction. The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

FIG. 1 is a simplified block diagram illustrating a system architecture of a context-based word prediction system 100. As illustrated in FIG. 1, a user 110 utilizes an input method 115 for entry of text or data into a document, for example, an electronic mail message, a word processing document, a spreadsheet application document, a slide presentation application document, an electronic handwriting application document, and the like. The input method 115 is illustrative of an input method editor (IME) which is used for typing or otherwise entering text or data input. Other suitable input methods 115 include handwriting recognition engines, handwriting text input panels, voice or speech recognition engines, and the like. As should be appreciated, any input method that benefits from a lexicon data source may benefit from words stored in an application defined data source as is described herein.

Referring still to FIG. 1, an application 170 is illustrative of any software application with which a user 110 may enter and edit text or data using the input method 115, for example, a word processing application, and electronic mail application, a spreadsheet application, a slide presentation application, an electronic handwriting application, and the like.

The text framework 120 includes a prediction engine 125 and data sources 130 for providing word prediction during the entry of text or data via the input method 115. As is described in detail below, the prediction engine 125 is a software application module operative to retrieve words from one or more data sources in response to text or data character entry received via the input method 115. The prediction engine 125 is operative to retrieve words from the data sources 130 and for passing the retrieved words back to the input method 115 for presentation to the user 110 in response to text or data characters entered by the user 110 via the input method 115.

The data sources 130 may include an application defined data source (ADDS) 150 and may include one or more other existing text prediction data sources 135. According to embodiments, the software application 170 parses a received or previously prepared document, for example, a received electronic mail message, a previously prepared word processing document, a previously prepared slide presentation document, and the like and stores words parsed from the received or previously prepared document in the application defined data store 160. An application defined candidate provider 155 serves as an interface between the application defined data store 160 and the prediction engine 125. Alternatively, as described further below, the input method 115 may parse words from a document for storage in an ADDS created by the input method 115 for subsequent use in a candidate list of predicted words.

Words stored in the application defined data store 160 may be ranked according to their relevance to each other and according to the probability or likelihood that they will be utilized by the prediction engine 125 for presentation in a candidate word list. For example, statistical weighting may be applied to words based on relationships between words, such as whether a particular word is traditionally a noun followed by a verb. Such ranking analysis is useful in determining a likelihood or probability that a given word is more likely a desired word for completing a text entry, and thus, for inclusion in a candidate word list provided by the context-based word prediction system described herein. For example, if the words "thesaurus" and "the" are parsed by the application 170 and are placed in the application defined data source 150 for subsequent use by the prediction engine 125, the word "thesaurus" likely will receive a higher ranking than the word "the" so that if a user subsequently begins typing the characters "th" via the input method 115, the prediction engine may present the word "thesaurus" before the presentation of the word "the" based on the probability that the user 110 will require input assistance for the word "thesaurus" before requiring assistance with the input of the word "the." Algorithms for ranking words for presentation by a text/word prediction engine are well known to those skilled in the art and need not be discussed in detail herein.

According to an embodiment, the application defined data source 150 is created by the application 170 for each pre-existing or received document on a case-by-case basis. For example, if the application 170 is an electronic mail application, the application 170 may create an application defined data source 150 for each received electronic mail message for which a reply message is generated by the user 110 via the input method 115.

Referring still to FIG. 1, the existing text prediction data sources 135 are representative of pre-existing data sources, for example dictionaries, previously assembled collections of words entered by the user 110, contacts databases, technical terms databases and the like. The static word dictionary 145 is illustrative of a repository for containing such previously stored or assembled words. The static word provider 140 is illustrative of an interface between the static word dictionary database 145 and the prediction engine 125.

When a user enters text or data via the input method 115 in the context of a received, pre-existing, or otherwise related document received by or prepared via the application 170, the words parsed from the related document and stored in the application defined data source may be utilized by the prediction engine 125 before the prediction engine 125 utilizes words from the existing text prediction data sources for presentation to the user via the input method 115 because the words contained in the application defined data source are more likely to be the words being entered by the user in a document related to the received or pre-existing document.

Thus, from the foregoing, when a user 110 begins inputting text in a document, the input method 115 calls into the prediction engine 125 as each character is entered in order to get word prediction candidates that match the current user input. The prediction engine 125 retrieves word results from the application defined data source 150 (which is populated with words from a related document) and from existing lexicon data sources contained in the existing text prediction data sources, including statistical word information, input history, etc. The word candidates are then returned by the prediction engine 125 to the input method 115 where they are displayed to the user as word prediction results in a word candidate list.

Figure 2A:
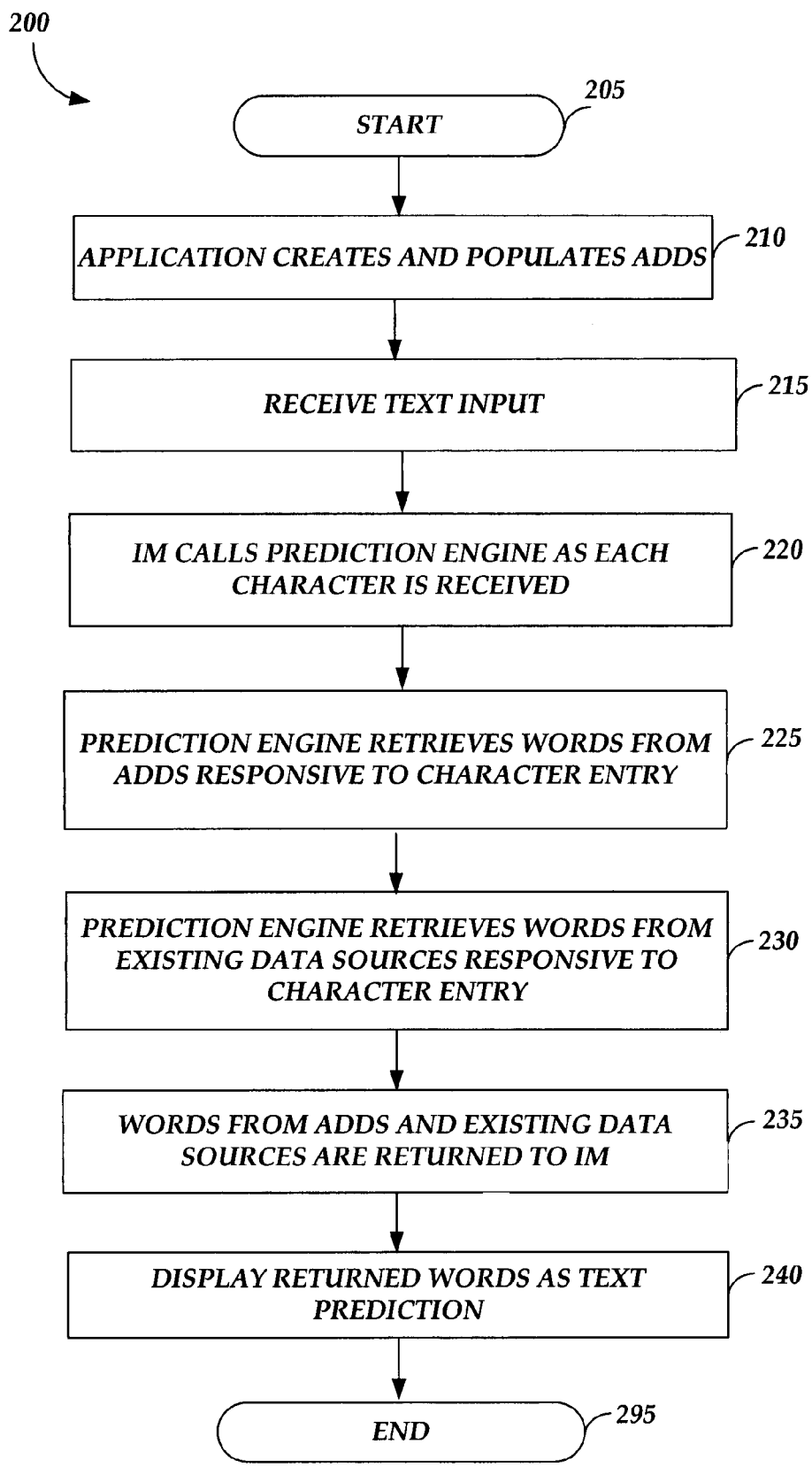
FIG. 2A is a logical flow diagram illustrating a method for providing context-based word prediction.

Having described a system architecture for context-based word prediction, FIG. 2A is a logical flow diagram illustrating a method for providing context-based word prediction. The context-based word prediction routine 200 begins at start operation 205 and proceeds to operation 210 where an application 170, for example, an electronic mail application, a word processing application, a slide presentation application, a spreadsheet application, and the like creates and populates an application defined data source (ADDS) based on a received or previously created document. A description of the preparation of an application defined data source for a received electronic mail message is described below with reference to FIG. 3, and a description of the creation of an application defined data source for a previously prepared document is described below with reference to FIG. 4.

At operation 210, the application 170 creates an instance of the application defined data source 150 including an instance of the application defined data store 160 and the application defined candidate provider 155. Text or data contained in the received or previously created document are parsed by the application 170, and individual words making up the parsed document are populated in the application defined data store 160. According to an embodiment, the candidate provider is operative to interpret an internal data format of the ADDS and extract words and probability information for extracted words based on a given text input from the user. As is understood by those skilled in the art, the candidate provider may make complex determinations of the probability that one or more words in the ADDS match a given input based on various properties, such as how the words in the ADDS relate to each other and to the input in a given language model, or the candidate provider may simply return all words from the ADDS that start with one or more text characters of a given text input in alphabetical order.

At operation 215, a text input is received via an input method 115, for example, a typing input method editor, a speech recognition engine, an electronic handwriting recognition engine, and the like. At operation 220, the input method 115 calls the prediction engine 125 as each character is received for the text or data input. At operation 225, the prediction engine 125 retrieves words from the application defined candidate provider of the application defined data source responsive to each successive character entry. At operation 230, the prediction engine 125 similarly retrieves words from the existing text prediction data sources 135 responsive to each character entry.

At operation 235, words from the application defined data source and words from the existing text prediction data sources retrieved by the prediction engine 125 are returned to the input method 115, and at operation 240, the words return to the input method 115 by the prediction engine 125 are displayed for selection by the user 110 for completing a word being entered via the input method 115. The context-based word prediction routine 200 ends at operation 295.

As described above, according to embodiments, because the application 170 parses words from a received or previously created document and stores the parsed words in the application defined data source, the prediction engine 125 is able to present words via the input method 115 that may be more contextually relevant to text or data being entered by the user 110 than are words contained in the existing text prediction data sources 135. For example, consider that the following example electronic mail message is received by the user 110 via an electronic mail message application 170.

EXAMPLE 1 (RECEIVED ELECTRONIC MAIL MESSAGE)

From: Alexandro Giordano.
Sent: Wednesday, Nov. 30, 2006, 9:35 p.m.
To: James Smith
Subject: Karazaki Mathematics Models
Jim, As you finish the Karazaki Mathematics Models, please check them into the Karazaki security site. Thanks, Alexandro Now consider that the following desired reply message is to be entered by the receiving user.

EXAMPLE 2 (REPLY ELECTRONIC MAIL MESSAGE)

From: James Smith
Sent: Wednesday, Nov. 30, 2006, 10:03 p.m.
To: Alexandro Giordano
Subject: RE: Karazaki Mathematics Models
Alexandro, My team has drafts of our Karazaki Mathematics Models. Should we check them into the security site now, or wait until they are completely finished? Thanks, James According to embodiments of the invention, the application 170 parses the received electronic mail message (Example 1) and stores words contained in the received electronic mail message in the application defined data store 160 of the application defined data source 150 for subsequent display via the input method 115 when the user 110 is preparing the responsive reply electronic mail message (Example 2). As illustrated above, a number of words contained in the desired responsive electronic mail message are contained in the originally received electronic mail message. Words entered into the responsive electronic mail message that also occurred in the originally received electronic mail message are underlined in the example electronic mail message for emphasis only.

Referring to the example responsive electronic mail message (Example 2), a number of words are repeated from the originally received electronic mail message. For example, the words "thanks," "Alexandro," "finish," "Karazaki," "Mathematics," "Models," "check," "them," "into," "the," "security," "site," and "James" all appear in the responsive electronic mail message. While some of these repeating words, for example "check," "finish," "them," and "into" may be stored in an existing text prediction data sources, for example, a dictionary, many do not or will not have a high enough probability in the existing text prediction data sources to be presented to the user 110 via the input method 115 without use of the application defined data source 150 after character entry by the user 110. For example, without use of the application defined data source 150 for these words, when the user begins to type a word such as "check," by entry of the characters "ch," without use of the application defined data source 150, other words may be presented to the user 110 from the existing text prediction data sources 135, for example, "chair," "challenge," "chance," and the like, and the desired word "check" may be presented further down a line of potential words extracted from the existing text prediction data sources, or the word "check" may not be presented at all. Thus, because the word "check" is placed in the application defined data source as being contextually relevant to the document being created, for example, a responsive electronic mail message to an originally received electronic mail message containing the word "check," the word may be presented at or near the top of a list of word prediction candidates presented to the user 110 via the input method 115 to allow the user to quickly select from the word prediction candidates for completing a word being entered by the user. Other more complex or less common words, for example, names such as "Alexandro" or "Karazaki" may not be presented at all without the use of the context-based application defined data source 150 where these words are given a greater probability of subsequent entry by their inclusion in the application defined data source. Thus, without the presentation of such complex or unique words in a word prediction list to the user 110, the user would be forced to type or otherwise enter each and every character of the desired words.

According to one embodiment, context-based word prediction may be utilized for phrase prediction and completion. For example, if the application 170 parses the text contained in a document and determines that two or more words comprise a phrase of words, the phrase of words may be stored in the application defined data source, and the prediction engine may be utilized for offering a phrase of words in the candidate list for use in automatically completing the entry of the phrase when the entry of the phrase is subsequently commenced. For example, if the application 170 determines that the two words "software" and "developer" are used together to create the phrase "software developer," the phrase may be stored in the application defined data source, as described above. Subsequently, if a user enters the character "s," in addition to the word "software" being provided in a candidate list, the phrase "software developer" may also be offered in the candidate list for possible selection by the user.

Figure 2B:
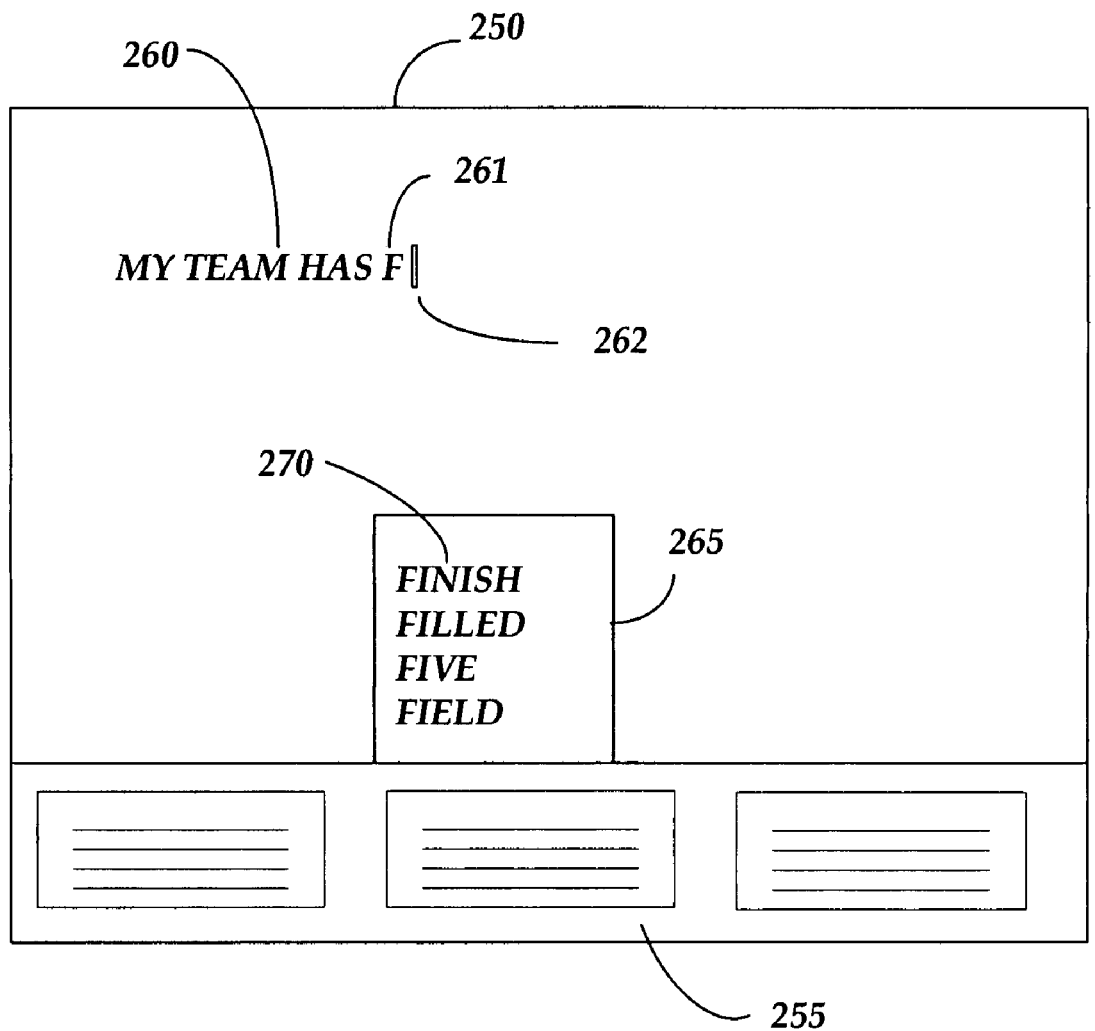
FIG. 2B is a simplified block diagram illustrating a mobile computing device with which context-based word prediction is employed.

FIG. 2B is a simplified block diagram illustrating a mobile computing device with which context-based word prediction may be employed. The mobile computing device 250 includes a text display area 252 and a keyboard area 255 with which text or data may be entered into the text display area. The keyboard 255 is representative of one type of input method 115, described above with reference to FIG. 1. Other types of input methods are equally applicable to embodiments described herein. For example, for another type of computing device 250, the keyboard 255 may take the form of an electronic handwriting recognition engine and stylus for writing. Similarly, the keyboard 255 may take the form of a speech recognition engine and microphone for receiving audible speech.

As illustrated in FIG. 2B, a text string "My team has f" has been entered by the user. The last character entered by the user is the character "f," and the cursor 262 is in position for entry of a second character. For purposes of example, consider that the text string 260 being entered by the user is a reply electronic message to a previously received electronic message which contains the word "finish," as described above for the example electronic mail message (Example 1). Because the word "finish" has been stored in the application defined data source 150, when the user enters the character "f," a word candidate list 265 is automatically generated by the input method 215 and is populated with words retrieved by the prediction engine 125 from the application defined data source 150 and from one or more existing text prediction data sources 135, as described above. As illustrated in FIG. 2B, the word "finish" 270 is illustrated in the word candidate list 265. If the user desires to complete the word presently being entered with the word "finish," the user may select the desired word from the word candidate list, and the word presently being entered will automatically be completed with the selected word.

Figure 3:
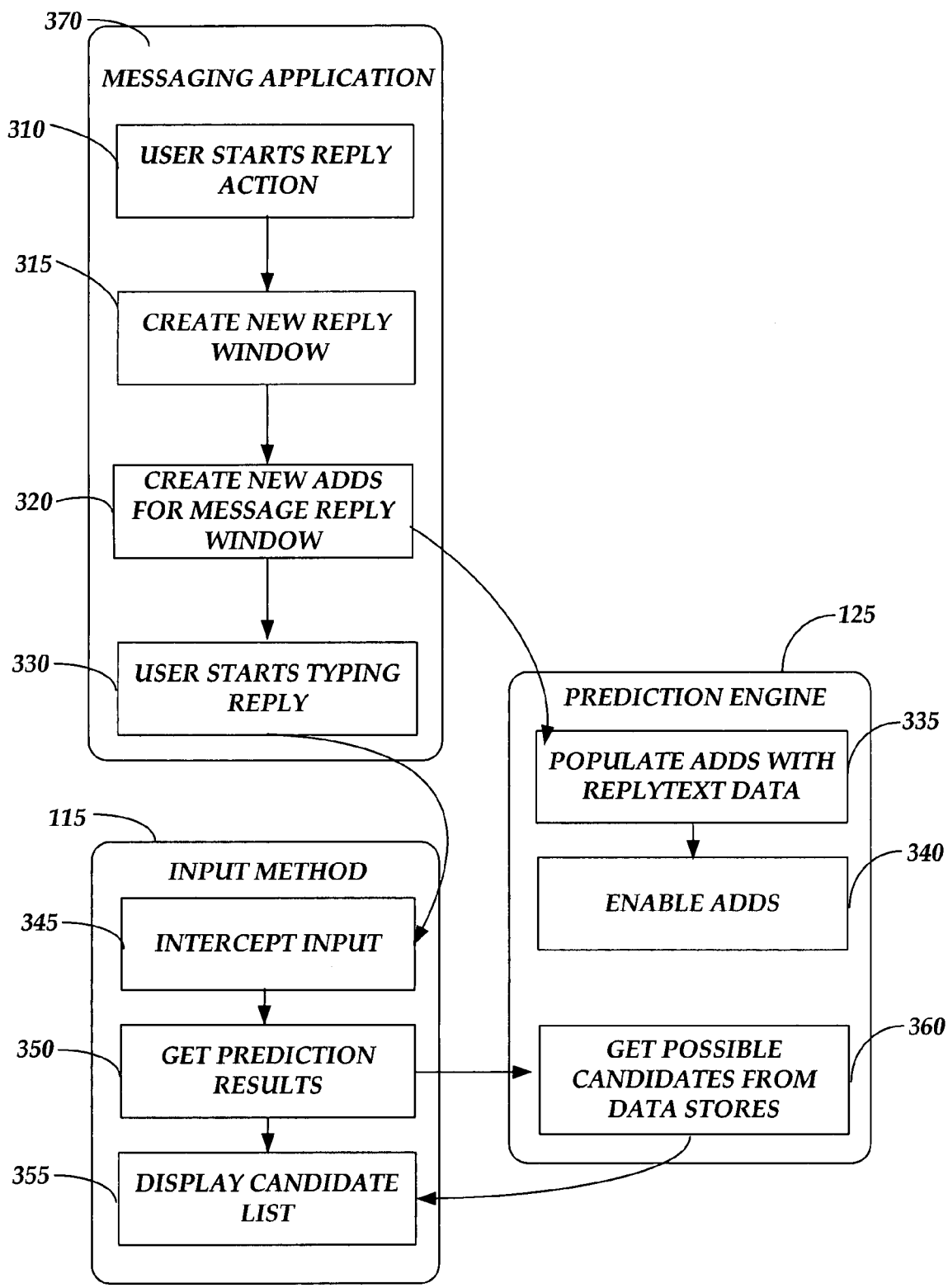
FIG. 3 is a state diagram and operational flow illustrating a method for providing context-based word prediction via an electronic messaging application.

FIG. 3 is a state diagram and operational flow illustrating a method for providing context-based word prediction via an electronic messaging application. The operational flow and components illustrated in FIG. 3 provide further detail with respect to operation of embodiments of the present invention with respect to an electronic mail messaging application. Referring to FIG. 3, the electronic mail messaging application 170 begins at operation 310 when a user 110 starts a reply action by attempting to reply to a previously received electronic mail message (see Example 1 above). At operation 315, the messaging application 170 creates a new reply window in which the user may type or otherwise enter a reply electronic mail message (see Example 2 above).

At operation 320 the messaging application 170 creates a new application defined data source (ADDS) 150 for the reply message being entered by the user. As described above, creation of the new application defined data source includes creating an instance of the application defined data store 160 and an instance of the application defined candidate provider 155. At operation 335, the messaging application 170 parses the originally received electronic mail message and populates the application defined data source with reply text data in the form of words parsed from the received electronic mail message the reply text data available to the prediction engine 125. At operation 340, the newly created application defined data source 150 is enabled for use by the prediction engine 125.

Referring back to the messaging application 170, at operation 330, the user 110 begins typing or otherwise entering text or data into the reply message window in response to the received electronic mail message. As the user begins entering reply text or data, the input method 115 intercepts each character of entered data on a character-by-character basis at operation 345. At operation 350, the input method 115 calls the prediction engine 125 to obtain prediction results responsive to the entered text or data character. At operation 360, the prediction engine 125 obtains words from both the application defined data source 150 via the application defined candidate provider 155 and from the existing text prediction data sources 135 via the static word provider 140 at operation 360. As described above, words provided from both the application defined data source and the existing text prediction data sources may be ranked according to one or more ranking algorithms for ultimate display to the user at operation 355 via the input method 115. As described above with reference to FIGS. 1 and 2, the context-based word prediction system of the present invention allows for the presentation of candidate words to the user that are contextually relevant to the document being created or edited that otherwise would not be presented or would be presented at a much lower ranking if the prediction engine 125 could only access the existing text prediction data sources and not the application defined data source.

Figure 4:
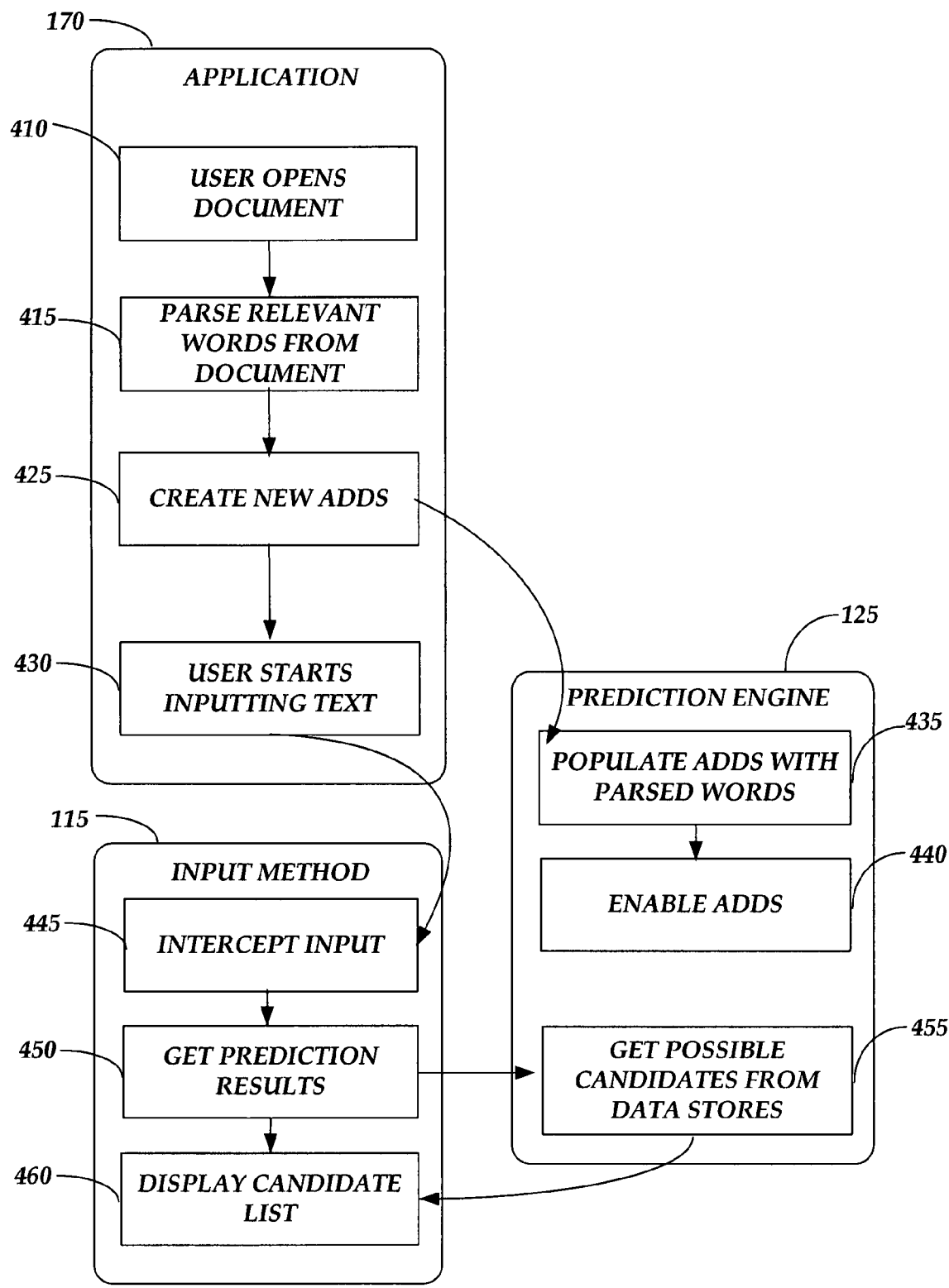
FIG. 4 is a state diagram and operational flow illustrating a method for providing context-based word prediction via a software application.

FIG. 4 is a state diagram and operational flow illustrating a method for providing context-based word prediction via another type of software application 170, for example, a word processing application, a spreadsheet application, a slide presentation, and the like, with which documents may be produced containing text or data that may be used for building an application defined data source 150 for predicting words in related documents. In contrast to the starting of a reply action described with reference to FIG. 3, at operation 410, the user opens a document generated by the application 170, for example, a word processing document, such as a letter or memorandum.

At operation 415, the application 170 parses the opened document for words that may be used to create an application defined data source 150 for subsequent use by the prediction engine 125 for generating context-based word prediction. At operation 425, the application 170 creates the application defined data source 150 in the same manner as described above with reference to FIG. 3, and at operation 435, in conjunction with the prediction engine 125, the application 170 populates the application defined data source with the words parsed from the opened document. At operation 430, the user begins inputting text or data into the open document, and at operation 445, the input method 115 intercepts the input and proceeds to obtain and display a candidate list of predicted words in the same manner as described above for the electronic messaging application.

According to an embodiment, opening a document at operation 410 may include opening the same document for which an application defined data source previously has been generated by the application 170. That is, according to this embodiment, when a document is generated using the application 170, an application defined data source may be created and stored for subsequent use in editing or adding/deleting text in the same document. Alternatively, the application defined data source may be generated dynamically as the document is being generated in the first instance. For example, if a first line of text entered into a new document includes the word "modification," an application defined data source may be dynamically updated to include the word "modification" in the data store 160. Thus, if in a subsequent sentence or paragraph, the user types the character "m," the prediction engine may fetch words beginning with the character "m" including the word "modification" dynamically added to the application defined data source during the present editing session of the document.

Alternatively, an application defined data source created for a first document may be related to a second document during creation of the second document or editing of the second document. For example, upon launching a second document, a user may be provided an opportunity to browse to or link to a first document for which an application defined data source has been created which may assist the user in generating or editing the second document. For example, if the user knows that a memorandum was previously produced for which an application defined data source was generated, the user may associate a related letter document with the previously generated memorandum document so that the application defined data source created for the memorandum document will be available for generating and editing the letter document.

Figure 5:
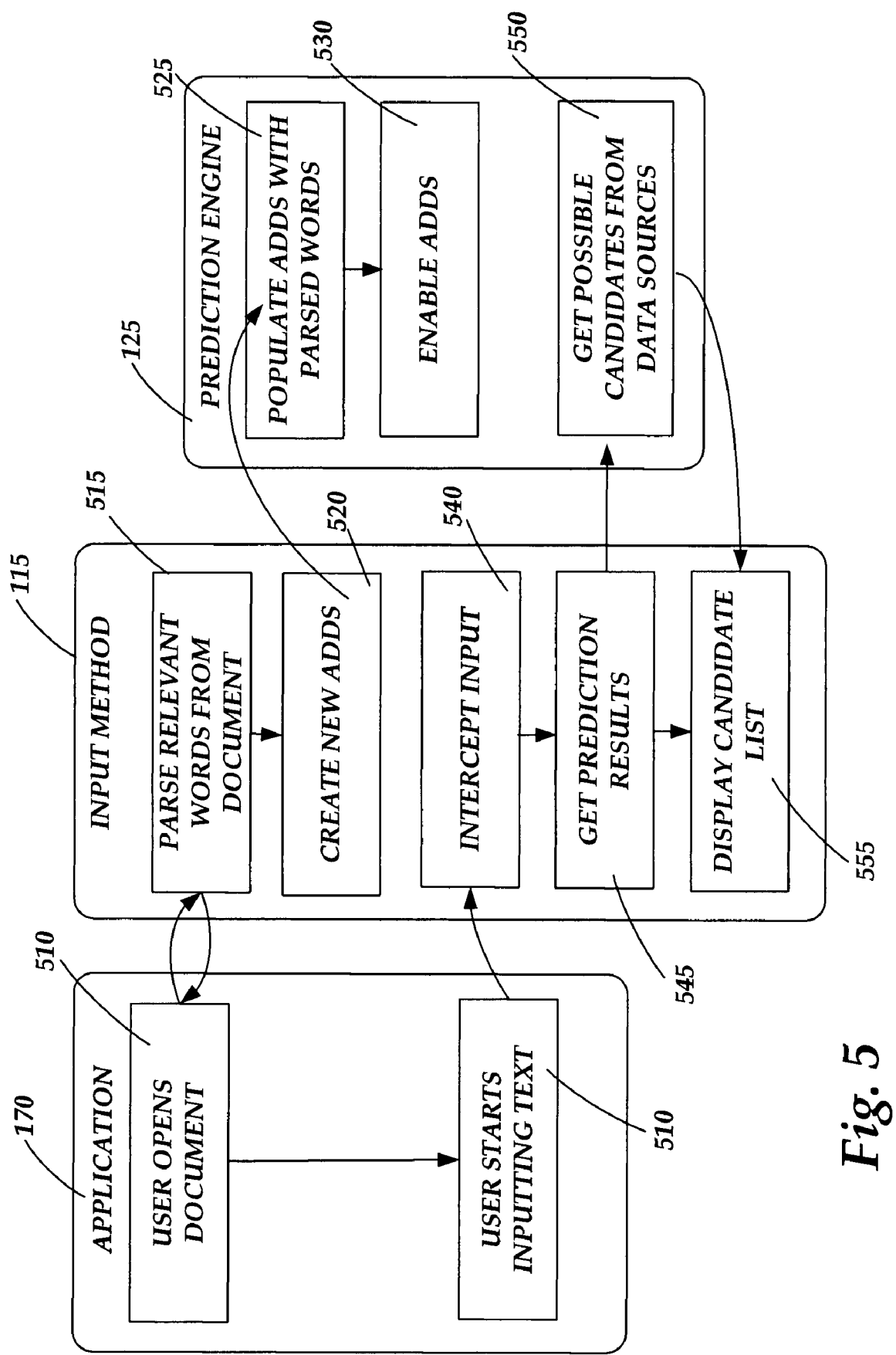
FIG. 5 is a state diagram and operational flow illustrating a method for providing context-based word prediction from text retrieved from an application document.

FIG. 5 illustrates an alternative method for creating an application defined data source (ADDS) from an application document. At operation 510, a user opens a document generated by an application 170, and at operation 515, the input method 115 retrieves text from the application document, parses the text, and creates an application defined data source at operation 520. At operation 525, the prediction engine 125 populates the application defined data source with words parsed from the opened document, and at operation 530, the prediction engine 125 enables the application defined data source for subsequent in providing predicted words.

Referring back to the application 170, when the user begins entering new text or editing text in the opened document at operation 535, the input method 115 intercepts the text input at operation 540. At operation 545, the input method 115, obtains prediction results from the prediction engine 125 by obtaining possible candidates from the various data sources 130, including the created ADDS for this document. At operation 555, a candidate list of predicted words is displayed for the user, as describe above. Advantageously, this embodiment of the present invention allows for creation of an application defined data source from an opened application document without requiring modifications to existing applications.

As described above, the input method 115 may include a number of different types of input methods, for example, typing, electronic handwriting, speech recognition, etc. If the input method 115 is a speech recognition engine, the accuracy of the speech recognition engine in understanding spoken words of a given user may be improved using the context-based word prediction system of the present invention. If a word or phrase is spoken into a speech recognition input method 115 by a user, and the user selects a word from a candidate list provided by the context-based word prediction system 100 for correction of or completion of a word spoken into the speech recognition input method, then the speech recognition input method accuracy will be improved because the input method will learn how to interpret the spoken words of the user with improved accuracy.

Figure 6:
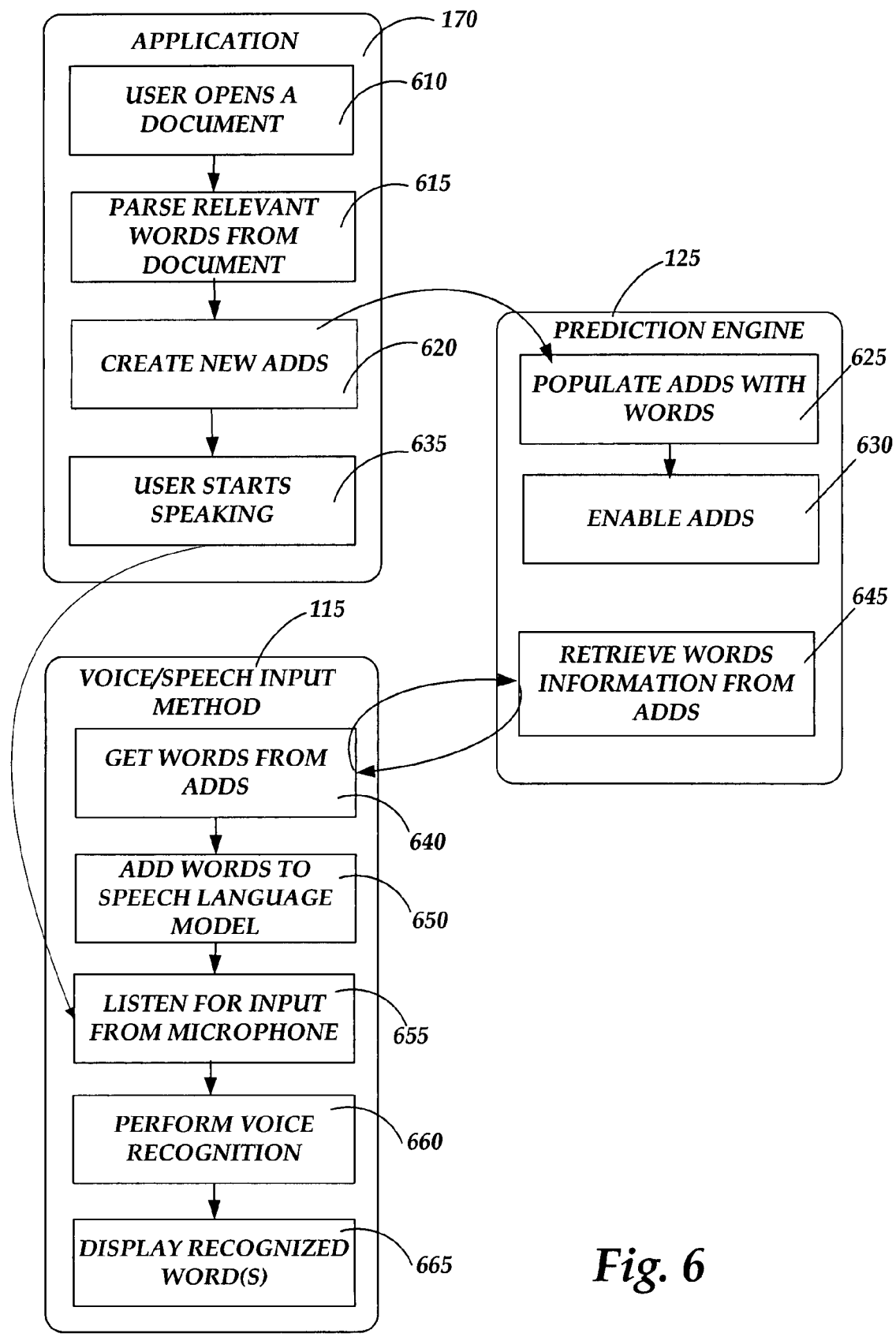
FIG. 6 is a state diagram and operational flow illustrating a method for providing context-based word prediction via a speech or voice recognition input method.

FIG. 6 is a state diagram and operational flow illustrating a method for providing context-based word prediction via a speech or voice recognition input method. At operation 610, a user opens a document to be created or edited using a speech or voice recognition engine as the input method 115. At operation 615, the opened document is parsed for relevant words from the document, and at operation 620, the application creates a new application defined data source for the opened document. At operation 625, the prediction engine 125 populates the created application defined data source with words parsed from the opened document. At operation 630, the ADDS is enabled for use.

Referring back to the application 170, at operation 635, the user begins speaking into the microphone of the voice or speech recognition input method 115. At operation 640, the input method 115 obtains words from the ADDS that are responsive to the input received at operation 635. As should be appreciated, the input method 115 may obtain the words from the ADDS via a variety of interfaces operative to allow the retrieval of the stored words. At operation 650, the words obtained from the ADDS are added to a speech language model operated by the voice or speech recognition input method.

At operation 665, the input method 115 listens to the voice or speech input received from the user via the microphone of the input method 115. At operation 660, the input method 115 performs voice recognition on the spoken words, and at operation 665, the input method 115 displays recognized words including words retrieved from the ADDS responsive to the voice recognition performed on the spoken input from the user. As described above, the displayed recognized words may be displayed in a candidate list of predicted words from which the user may select for completion of one or more spoken words. Alternatively, words retrieved from the ADDS may not be displayed in a candidate list, and the words may instead be used by the voice/speech recognition input method to improve its accuracy by having a greater number of words from which to choose for completing a voice/speech input.

In the case of handwriting recognition engines, the context-based word prediction system 100 may be utilized for predicting words or data, and for improving the accuracy of the handwriting recognition engine. As with the typing input method described above, when a user enters a character using an electronic handwriting input method, the handwritten character may be utilized by the prediction engine 125 for retrieving matching words from the application defined data source 150 and from existing text prediction data sources 135. In addition, the context-based word prediction system may be used for matching handwriting strokes to words or data in the data sources 130. For example, if an electronic handwriting stroke is recognized as a stroke that can only belong to the character "A," then the electronic handwriting input method 115 may pass the character "A" to the prediction engine for retrieving words or data beginning with the character "A."

In addition, in the case of a handwriting input method 115, the accuracy of the handwriting input method may be improved for a given user utilizing the context-based word prediction system described herein. For example, if the user handwrites a word not found in the data sources 130, then the user will be required to correct the results of the handwritten word if the handwriting input method 115 incorrectly interprets the word written by the user. On the other hand, if the user selects a word provided in a word candidate list generated by the context-based word prediction system for completing a partially handwritten word, the accuracy of the handwriting input method 115 will be improved because the input method will be able to match the handwritten character or text received by the user to the correct word selected from the candidate list so that the handwriting input method will learn how to more accurately recognize the user's personal style of handwriting the subject word. Accuracy of the handwriting input method 115 may likewise be improved on a stroke-by-stroke basis. That is, if the user is provided a candidate list of words in response to one or more strokes entered by the user, and the user selects a word from the candidate list, then the handwriting input method accuracy will be improved where the handwriting input method will now be able to more accurately interpret the electronic handwriting strokes entered by the user.

Figure 7:
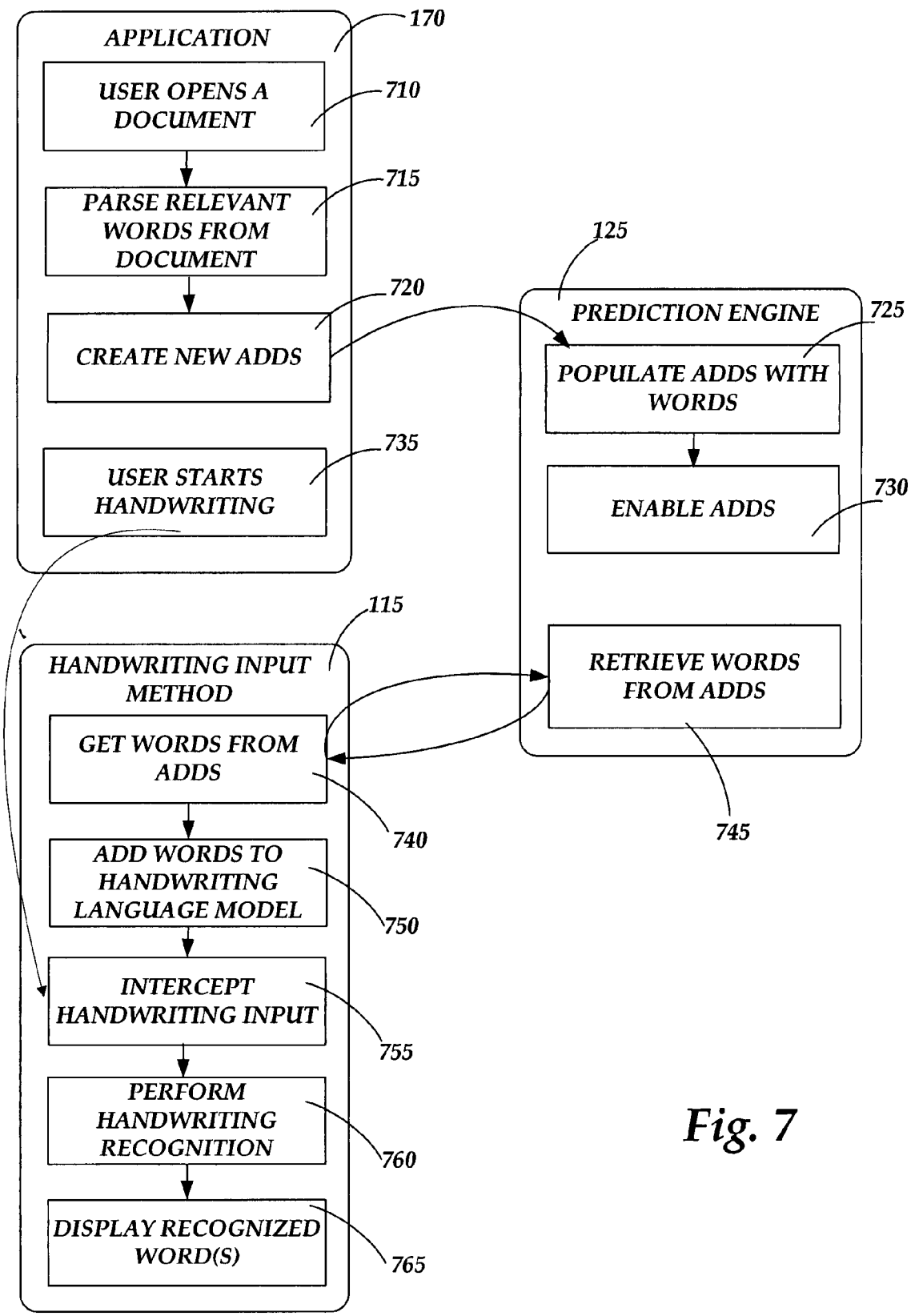
FIG. 7 is a state diagram and operational flow illustrating a method for providing context-based word prediction via a handwriting recognition input method.

FIG. 7 is a state diagram and operational flow illustrating a method for providing context-based word prediction via a handwriting recognition input method. At operation 710, a document is opened with application 170 for creation or text input using a handwriting recognition input method 115. At operation 715, the application 170 parses relevant words from the opened document, and at operation 720, the application 170 creates a new application defined data source. At operation 725, the prediction engine 125 populates the application defined data source with words parsed from the opened document, and at operation 730, the prediction engine 125 enables the ADDS for subsequent use.

At operation 735, the user begins to edit or add to the open document using the handwriting recognition input method 115. At operation 740, the handwriting recognition input method 115 obtains words from the enabled ADDS that are responsive to the input received at operation 735. As should be appreciated, the input method 115 may obtain the words from the ADDS via a variety of interfaces operative to allow the retrieval of the stored words. At operation 750, the obtained words are added to a handwriting language model operated by the handwriting recognition input method 115.

At operation 755, the input method 115 intercepts hand written words or other text entered by the user at operation 735. At operation 760, the input method 115 performs handwriting recognition on the handwritten input. At operation 765, the input method 115 displays a candidate list of words responsive to the handwriting recognition including words obtained from the enable ADDS that are responsive to the handwriting recognition applied to the handwritten input. Alternatively, words retrieved from the ADDS may not be displayed in a candidate list, and the words may instead be used by the voice/speech recognition input method to improve its accuracy by having a greater number of words from which to choose for completing a voice/speech input.

As described above, according to an embodiment of the invention, the context-based word prediction system 100 illustrated in FIG. 1 may reside and operate on a single computing device, for example, a mobile computing device, a desktop computing device, a server-based computing device, and the like. According to another embodiment, information created and stored in the application defined data source of one computing device may be transferred to a second computing device for use in preparation of a document on the second device. For example, a user may be utilizing the context-based word prediction system with the preparation of electronic mail messages on the user's desktop computing device in the user's office or home. Subsequently if the user begins traveling and desires to prepare documents, for example, electronic mail messages, on a mobile computing device, it is advantageous to allow for a transfer of the application defined data source from the user's desktop computing device to the user's mobile computing device.

Figure 8:
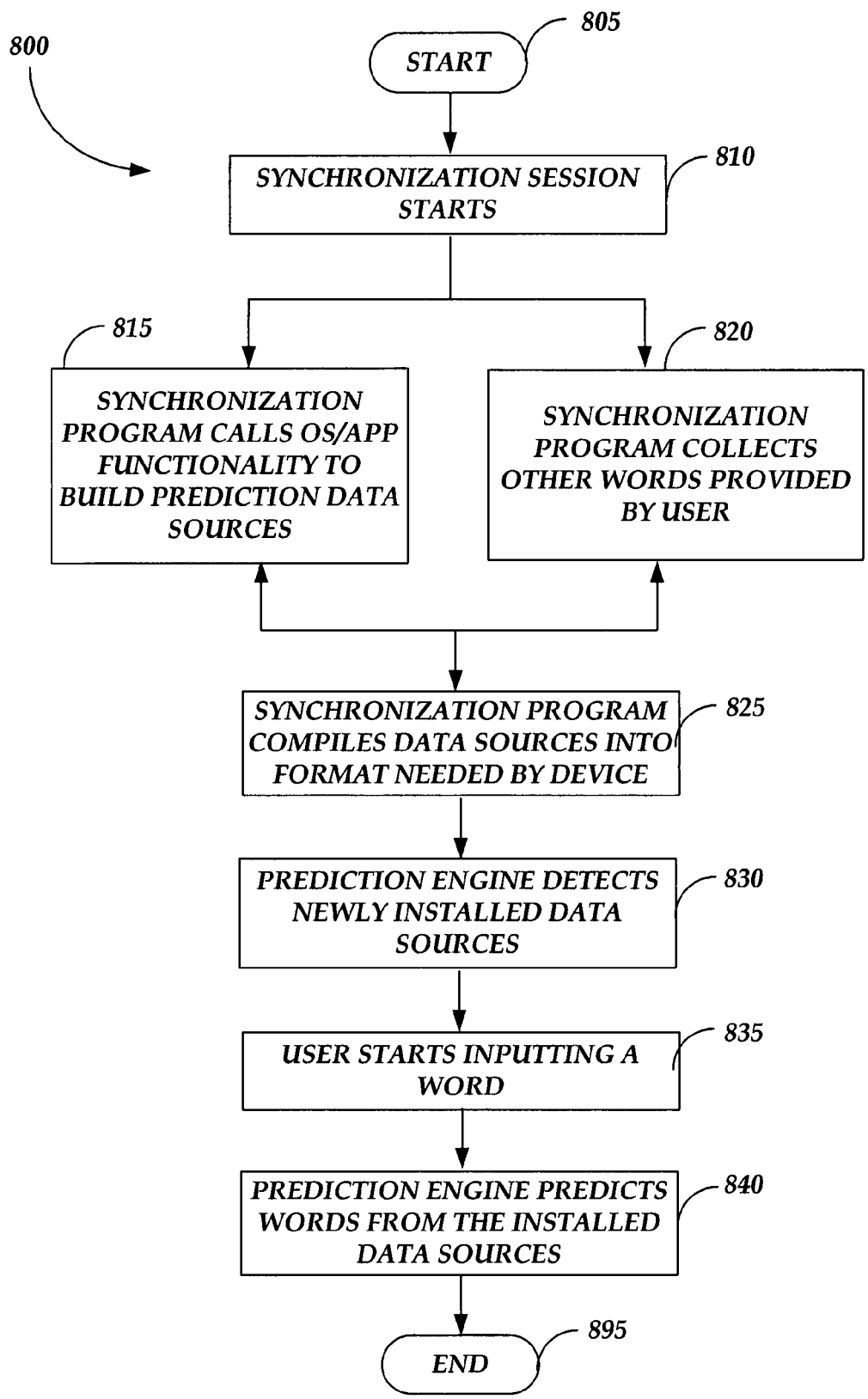
FIG. 8 is a logical flow diagram illustrating a method for utilizing context-based word prediction information on one computing device that was generated on another computing device.

FIG. 8 is a logical flow diagram illustrating a method for utilizing distributed context-based word prediction information between different computing devices. The application defined data source transfer routine 800, illustrated in FIG. 8, begins at start operation 805 and proceeds to operation 810 where a synchronization session between a first computing device and a second computing device is initiated. The synchronization session initiated at operation 810 synchronizes data between a first computing device, for example, a desktop computing device or server with a second computing device, for example, a separate desktop computing device or a mobile computing device. During the synchronization session, data from the first computing device may be readily exchanged with the second computing device. An example synchronization session may be provided by the ACTIVESYNC software provided by MICROSOFT CORPORATION of Redmond, Wash. wherein a synchronization session may be provided between a server and a separate computing device, for example, a mobile computing device. As should be appreciated, other types of synchronization session programs which allow a transfer of data from one computing device to a second computing device may be suitable for the embodiments described herein.

At operation 815, the synchronization session program 802 (FIG. 9) calls the computing device on which the text prediction data sources 130 are located, including the application defined data source 150 and the existing text prediction data sources 135, and requests information from those sources for building a similar word prediction dictionary that will be transferred to the second computing device, for example, the mobile computing device 250. According to embodiments, the synchronization session program may call the operating system of the first computing device for retrieving the required information, or the call may be placed to the application 170 for retrieving the required information.

At operation 820, the synchronization session program collects other words that may be used by the second computing device, for example, words that have been added to a spellchecking program, words that have been provided to an autocorrect dictionary program, user-provided words, and the like. At operation 825, the synchronization session program compiles the information obtained at operations 815 and 820 into a data format suitable for the computing device to which the data will be transferred. At operation 825, the second computing device is notified of the availability of the compiled information when the compiled information is transferred to the second computing device via the synchronization session established between the first computing device and the second computing device. As should be understood, in order for the second computing device to utilize the information transferred to the second computing device, the context-based word prediction system 100 illustrated and described with reference to FIG. 1 should be available on the second computing device.

At operation 830, the prediction engine 125 resident on the second computing device detects the newly installed data sources that have been compiled and transferred to the second computing device via the synchronization session program. As should be appreciated, because the context-based word prediction system 100 is available on the second computing device, as the user utilizes the second computing device for preparing, responding to or otherwise editing or modifying documents on the second computing device, the context-based word prediction system 100 on the second computing device may create additional application defined data sources 150 or may supplement those data sources transferred to the second computing device from the first computing device.

At operation 835, the user starts inputting a word in a document on the second computing device in the same manner as described above with reference to FIGS. 2, 3 and 4. At operation 840, the prediction engine 125 on the second computing device predicts words from the data transferred to the second computing device from the first computing device and provides a candidate list of words to the user for automatic completion of text input.

According to an alternate embodiment, the data compiled by the synchronization session program may be maintained at the first computing device, and the data transfer prediction engine 125 on the second computing device may request the compiled data from the first computing device as each text input is received at the second device. That is, the compiled data remains on the first computing device, and the second computing device may access and retrieve data from the first computing device via the synchronization session where the data has been compiled in a format required by the second computing device.

Operating Environment

Figure 9:
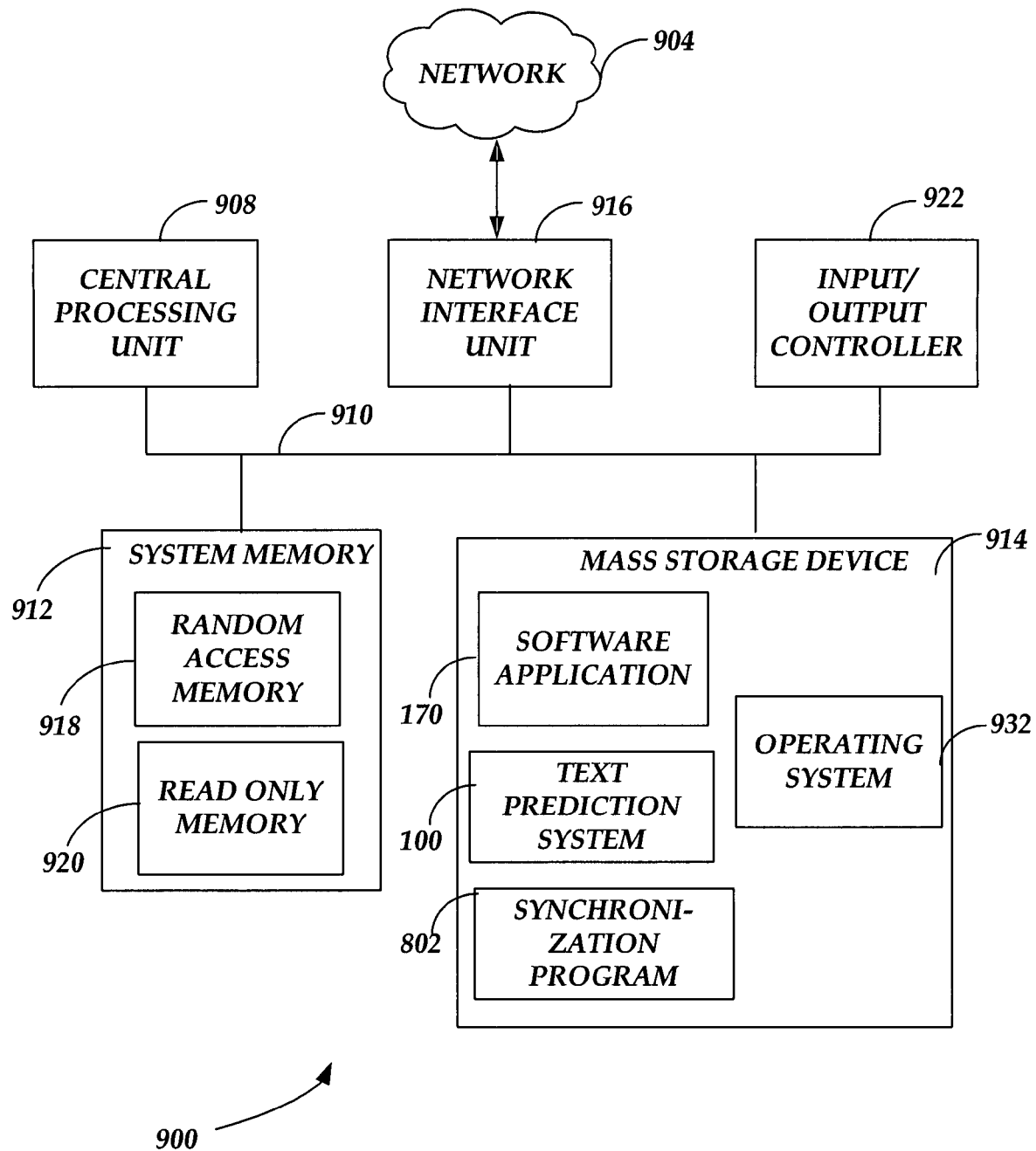
FIG. 9 illustrates an exemplary computing operating environment in which embodiments of the present invention may be practiced.

Referring now to FIG. 9, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 9, an illustrative operating environment for embodiments of the invention will be described. As shown in FIG. 9, computer 900 comprises a general purpose desktop, laptop, handheld, mobile or other type of computer (computing device) capable of executing one or more application programs. The computer 900 includes at least one central processing unit 908 ("CPU"), a system memory 912, including a random access memory 918 ("RAM") and a read-only memory ("ROM") 920, and a system bus 910 that couples the memory to the CPU 908. A basic input/output system containing the basic routines that help to transfer information between elements within the computer, such as during startup, is stored in the ROM 920. The computer 902 further includes a mass storage device 914 for storing an operating system 932, application programs, and other program modules.

The mass storage device 914 is connected to the CPU 908 through a mass storage controller (not shown) connected to the bus 910. The mass storage device 914 and its associated computer-readable media provide non-volatile storage for the computer 900. Although the description of computer-readable media contained herein refers to a mass storage device, such as a hard disk or CD-ROM drive, it should be appreciated by those skilled in the art that computer-readable media can be any available media that can be accessed or utilized by the computer 900.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 900.

According to various embodiments of the invention, the computer 900 may operate in a networked environment using logical connections to remote computers through a network 904, such as a local network, the Internet, etc. for example. The computer 902 may connect to the network 904 through a network interface unit 916 connected to the bus 910. It should be appreciated that the network interface unit 916 may also be utilized to connect to other types of networks and remote computing systems. The computer 900 may also include an input/output controller 922 for receiving and processing input from a number of other devices, including a keyboard, mouse, etc. (not shown). Similarly, an input/output controller 922 may provide output to a display screen, a printer, or other type of output device.

As mentioned briefly above, a number of program modules and data files may be stored in the mass storage device 914 and RAM 918 of the computer 900, including an operating system 932 suitable for controlling the operation of a networked personal computer, such as the WINDOWS® operating systems from MICROSOFT CORPORATION of Redmond, Wash. The mass storage device 914 and RAM 918 may also store one or more program modules. In particular, the mass storage device 914 and the RAM 918 may store application programs, such as a software application 924, for example, a word processing application, a spreadsheet application, etc. According to embodiments of the present invention, a context-based word prediction system program 100 is illustrated for performing context-based word prediction as described herein. As should be appreciated, the context-based word prediction system may operate as a standalone application that may be called by a given software application 170, or the system 100 may be integrated with the programming of a given application 170. The synchronization session program 802 is a software program operative to provide a synchronization session between two or more computing devices as described above with reference to FIG. 8.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

We claim:

1. A computer-implemented method for providing context-based word prediction, comprising:
   parsing documents associated with different applications and obtaining words contained in the documents;
   creating context-based data sources for the words including creating a context-based data source for each different application, each context-based data source comprising an instance of an application defined candidate provider and an application defined data store for storing the words for an associated application;
   receiving a text input in a document having an associated context-based data source;
   retrieving one or more words associated with the text input received in the document from the associated context-based data source by utilizing words stored in the associated context-based data source before utilizing words from an existing text prediction data source as part of prediction of candidates using the text input; and
   displaying the one or more words retrieved from the associated context-based data source in the document and allowing selection of one of the one or more words displayed in the document for automatically completing the text input received in the document.

2. The method of claim 1, wherein displaying the one or more words retrieved from the associated context-based data source in the document includes displaying the one or more words retrieved from the associated context-based data source in a word candidate list displayed in the document.

3. The method of claim 1, further comprising passing the text input received in the document to the associated context-based data source prior to retrieving one or more words associated with the text input received in the document from the associated context-based data source and retrieving one or more words containing the text input received in the document.

4. The method of claim 3, wherein passing the text input received in the document to the associated context-based data source includes passing a request for the one or more words associated with the text input received in the document from an input method used for receiving the text input in the document to a text prediction engine operative to retrieve the one or more words from the associated context-based data source.

5. The method of claim 4, further comprising associating the associated context-based data source with one or more existing data sources, each of the one or more existing data sources containing one or more words that may be entered into the document.

6. The method of claim 5, further comprising retrieving from the one or more existing data sources one or more words associated with the text input received in the document.

7. The method of claim 6, further comprising displaying the one or more words retrieved from the one or more existing data sources along with the one or more words retrieved from the associated context-based data source in the document and allowing selection of one of the one or more words retrieved from the one or more existing data sources for automatically completing the text input received in the document.

8. The method of claim 7, wherein displaying the one or more words retrieved from the one or more existing data sources along with the one or more words retrieved from the associated context-based data source includes displaying the one or more words retrieved from the one or more existing data sources along with the one or more words retrieved from the associated context-based data source in a word candidate list displayed in the document.

9. The method of claim 4, wherein passing a request for the one or more words associated with the text input received in a second document from an input method used for receiving the text input in the second document, includes passing the request from a keyboard input method.

10. The method of claim 4,
    wherein passing a request for the one or more words associated with the text input received in a second document from an input method used for receiving the text input in the second document, includes passing the request from a speech recognition input method; and
    further comprising causing the speech recognition input method to use a word selected from the one or more words displayed in the second document to improve performance of the speech recognition input method by confirming that the text input received in the second document via the speech recognition input method is matches the selected word.

11. The method of claim 4,
    wherein passing a request for the one or more words associated with the text input received in a second document from an input method used for receiving the text input in the second document, includes passing the request from a handwriting recognition input method; and
    further comprising causing the handwriting recognition input method to use a word selected from the one or more words displayed in the second document to improve performance of the handwriting recognition input method by confirming that the text input received in the second document via the handwriting recognition input method matches the selected word.

12. The method of claim 1, prior to parsing a document and obtaining one or more words contained in the document, receiving an indication of editing the document.

13. The method of claim 1, wherein creating a context-based data source includes creating the context-based data source by a software application responsible for receiving the document and for receiving an indication of an opening of the document.

14. The method of claim 13, further comprising at the associated context-based data source, ranking the one or more stored words based on a likelihood that the one or more stored words will be entered into the document.

15. The method of claim 1,
    wherein receiving a text input in the document includes receiving a text input in a second document that is related to the document; and
    wherein displaying the one or more words retrieved from the associated context-based data source in the document and allowing selection of one of the one or more words displayed in the document for automatically completing the text input received in the document includes displaying the one or more words retrieved from the associated context-based data source in the second document and allowing selection of one of the one or more words displayed in the second document for automatically completing the text input received in the second document.

16. A method for providing distributed context-based word prediction, comprising:
    receiving documents at a first computing device;
    parsing the documents associated with different applications and obtaining words in the documents including a first document and obtaining one or more words contained in the first document;

creating context-based data sources for the words including creating a context-based data source for each different application, each context-based data source comprising an instance of an application defined candidate provider and an application defined data store for storing the words for an associated application at the first computing device;

compiling one or more of the context-based data sources into a format for utilization by a second computing device;

notifying the second computing device of the availability of a compiled context-based data source for use at the second computing device;

in response to receiving a text input in a second document at the second computing device, allowing the second computing device to retrieve one or more words associated with the text input received in the second document at the second computing device from the compiled context-based data source by utilizing words stored in an associated application defined data store for the first document available from the first computing device before utilizing words from an existing text prediction data source as part of prediction of candidates using the text input; and allowing from the first computing device a displaying of the one or more words retrieved from the compiled context-based data source in the second document at the second computing device and allowing selection of one of the one or more words displayed in the second document at the second computing device for automatically completing the text input received in the second document at the second computing device.

17. The method of claim 16, prior to notifying the second computing device of the availability of the compiled context-based data source for use at the second computing device, establishing a synchronization session between the first computing device and the second computing device for allowing data transfer between the first and second computing devices.

18. The method of claim 17, wherein notifying the second computing device of the availability of the compiled context-based data source for use at the second computing device includes allowing the second computing device to detect an installation of the compiled context-based data source at the second computing device.

19. A computer-readable storage medium containing computer executable instructions which, when executed by a computer, perform a method for providing context-based word prediction, comprising:

parsing documents associated with different applications to obtain parsed words including parsing a first document and obtaining one or more words contained in the first document that may be used for text input in a second document;

creating context-based data sources for the parsed words including creating a context-based data source for each different application, each context-based data source comprising an instance of an application defined candidate provider and an application defined data store, the creating including creating an associated context-based data source for storing the one or more words obtained from the first document;

receiving an indication of the opening of the second document, the second document being related to the first document;

associating the associated context-based data source with one or more existing data sources, each of the one or more existing data sources containing one or more words that may be used for text input in the second document;

receiving a text input in the second document;

retrieving one or more words associated with the text input received in the second document from the associated context-based data source and from one or more of the existing data sources; and displaying the one or more words retrieved from the associated context-based data source and from the one or more existing data sources in a word candidate list displayed in the second document in a display order based on contextual relevance to the text input, and allowing selection of one of the one or more words displayed in the second document for automatically completing the text input received in the second document.

20. The computer readable storage medium of claim 19, wherein retrieving one or more words associated with the text input received in the second document from the associated context-based data source and from one or more of the existing data sources includes passing a request for the one or more words associated with the text input received in the second document from an input method used for receiving the text input in the second document, includes passing the request from a non-typing input method; and further comprising causing the non-typing input method to use a word selected from the one or more words displayed in the second document to improve performance of the non-typing input method by confirming that the text input received in the second document via the non-typing input method matches the selected word.

* * * * *